H. NADORFF.
BUNG AND BUSHING THEREFOR.
APPLICATION FILED JUNE 7, 1912.

1,039,994.

Patented Oct. 1, 1912.

WITNESSES

INVENTOR
Henry Nadorff,
by James Sheehy & Co.
Attorneys.

UNITED STATES PATENT OFFICE.

HENRY NADORFF, OF LOUISVILLE, KENTUCKY.

BUNG AND BUSHING THEREFOR.

1,039,994.  Specification of Letters Patent.  Patented Oct. 1, 1912.

Application filed June 7, 1912. Serial No. 702,359.

*To all whom it may concern:*

Be it known that I, HENRY NADORFF, citizen of the United States, residing at Louisville, in the county of Jefferson and State of Kentucky, have invented new and useful Improvements in Bungs and Bushings Therefor, of which the following is a specification.

My present invention pertains to bungs and bushings therefor; and it consists in the peculiar and advantageous bung and bushing, hereinafter described and claimed, designed more particularly as an improvement upon the bung and bushing constituting the subject matter of my Letters-Patent Number 652,858, dated July 3, 1900.

Figure 1:
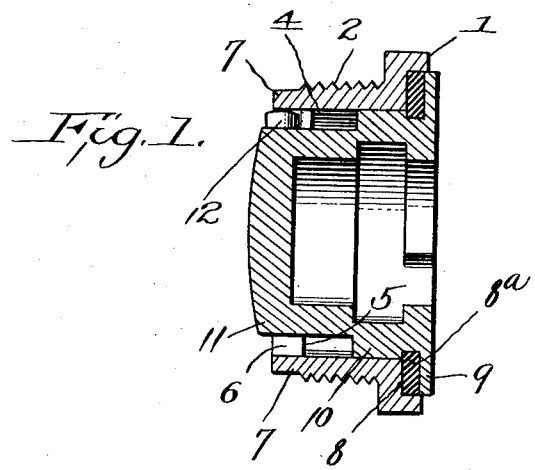
Figure 2:
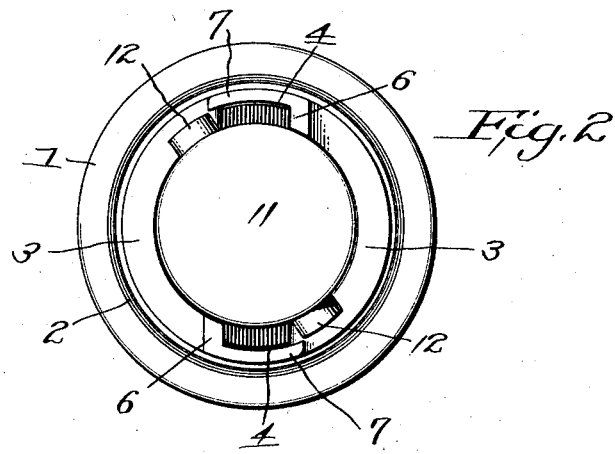
Figure 3:
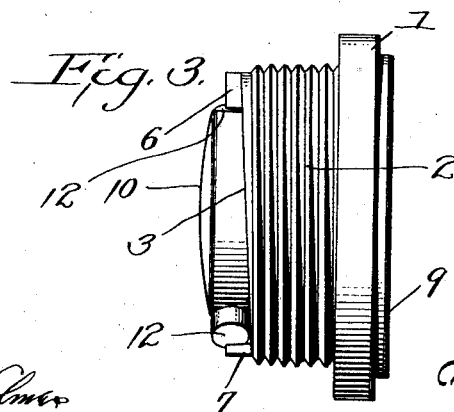

In the drawings, accompanying and forming part of this specification: Figure 1 is a diametrical section showing my novel bushing and the bung secured therein. Fig. 2 is a view illustrative of the inner side of the bung and bushing. Fig. 3 is a side elevation showing the inclined planes of the bushing which serve by coöperation with the lugs of the bung to hold the flange of the latter under pressure against the gasket.

Similar numerals of reference designate corresponding parts in all of the views of the drawings.

The bushing of my improved device is flanged at its outer end, as indicated by 1, and is exteriorly threaded at 2 and provided at its inner edge with oppositely disposed inclined planes 3. One of the said planes 3 extends in one direction from a kerf 4 formed in a flange 5 at the inner end of the bushing, and the other plane 3 extends in the opposite direction from another kerf 4 formed in the flange, the said flange 5 being disposed inward, and being provided with stops 6 and guards 7 for assuring the movement of the bung lugs, hereinafter referred to, in the proper direction incidental to the locking of the bung in the bushing. It will also be noticed that the bushing is characterized by a gasket seat 8, formed by the before mentioned flange 1.

The gasket 8ª which may be made of rubber, composition or any other material compatible with the purpose of my invention, may be arranged in the said seat 8, or may be made to tightly fit the bung so as to be removable with the latter, in the discretion of the manufacturer of my novel device.

For the sake of cheapness the bung comprised in my improved device is cast of iron or other suitable inexpensive material. The said bung is imperforate, and is constructed for the engagement of the conventional or any other suitable key employed in the locking and unlocking of the bung in the bushing. At its outer end the bung is exteriorly flanged, as indicated by 9, and between the said flange and the seat 8 in the bushing the gasket 8ª is entirely inclosed and is compressed and held under pressure. At 10 the bung is provided with an intermediate portion designed to fully occupy the interior of the bushing, and the said intermediate portion 10 merges into a reduced portion 11 of a diameter to extend through the inner flange 5 of the bushing. On the said reduced portion 11 and at diametrically opposite points are radial lugs 12, designed and adapted to coöperate with the flange 5 in the locking of the bung in the bushing.

In the practical use of my novel device, it will be manifest that in order to lock the bung in the bushing it is simply necessary to move the bung rectilinearly into the bushing and so that the lugs 12 of the bung pass through the kerfs of the bushing, after which the bung is turned about its axis, whereupon by reason of the lugs 12 moving against the inclined planes of the bushing, the gasket will be compressed between the bung and the bushing, and the bung will be frictionally secured against casual displacement, and the closure will be effected in a perfectly air-tight manner.

To remove the bung, the operation described is reversed, that is to say, the bung is turned about its axis in the direction opposite to that before referred to until the bung lugs bring up against the stops on the bushing, and said lugs are in registration or alinement with the kerfs in the bushing, when the bung can be expeditiously and easily withdrawn endwise to afford an opening into the barrel.

In addition to the function hereinbefore ascribed to them the guards 7 on the bushing serve to effectually prevent projecting portions of a stave from interfering with the proper coöperation of the bung lugs with the inclined planes of the bushing.

Having described my invention, what I claim and desire to secure by Letters-Patent, is:

The combination with a bushing having an exteriorly threaded portion and also having an outwardly directed flange, of right-angle form in cross-section, at the outer end of said portion and an inwardly directed flange at the inner end of the portion and also having a kerf in the second-named flange and a stop behind the kerf and a guard at the outer side of the same and further having an inclined plane extending from the opposite side of the kerf, with reference to the stop; of an imperforate bung provided at its outer end with an outwardly directed flange and also provided with an intermediate portion of a size to snugly occupy the portion of the bushing between the first and second-named flanges and further provided with a reduced inner portion designed to rest snugly in the second-named flange and equipped with a radial lug adapted to pass through the kerf in the inner flange and coöperate with the inclined plane thereof, and a gasket surrounding the bung and interposed between the flange thereof and the right angle flange of the bushing and adapted to be entirely inclosed by said flanges.

In testimony whereof I have hereunto set my hand in presence of two subscribing witnesses.

HENRY NADORFF.

Witnesses:
JOSEPH N. GRAF,
AUG. J. SENF.

Copies of this patent may be obtained for five cents each, by addressing the "Commissioner of Patents, Washington, D. C."